Patented Aug. 2, 1949

2,477,621

UNITED STATES PATENT OFFICE 2,477,621

PROCESS OF PRODUCING CERTAIN POLY-KETONES FROM SIMPLER KETONES BY MEANS OF DIACYL PEROXIDES

Morris S. Kharasch, Chicago, Ill., assignor to Eli Lilly and Company, Indianapolis, Ind., a corporation of Indiana No Drawing. Application March 9, 1945, Serial No. 581,946

10 Claims. (Cl. 260—592)

1

This invention relates to a process for producing larger ketones which have a plurality of keto groups from smaller ketones which have fewer keto groups; and to certain new multiketones so produced.

The smaller ketones must have hydrogen-carrying aprimary carbon atoms linked directly to keto groups; and in my process a hydrogen atom is removed from such an aprimary carbon atom, and the radicals resulting from such hydrogen removal are linked together.

In carrying out my present invention, I treat the smaller ketones at elevated temperature with a diacyl peroxide in which at least one of the acyl groups is an alkacyl group of not more than four carbon atoms; preferably with diacetyl peroxide. The diacyl peroxide is desirably a dialkacyl peroxide—that is (as defined below), one containing two alkacyl groups, such as acetyl, propionyl, or butyryl. But the diacyl peroxide may be an ar-alkacyl peroxide (defined below), for it is necessary only that there be one alkacyl group, so that the second acyl group may if desired be an aracyl group, such for instance as benzoyl. The diacyl peroxide used cannot be a diaracyl peroxide.

As used in this specification and its appended claims:

a. By "alkacyl group" I mean the acyl group of an alkyl carboxylic acid;

b. By "aracyl group" I mean the acyl group of of an aromatic carboxylic acid;

c. By "dialkacyl peroxide" I mean a peroxide in which both acyl groups attached to the bivalent —O—O— group are alkacyl groups;

d. By "diaracyl peroxide" I mean a peroxide in which both acyl groups attached to the bivalent —O—O— group are aracyl groups;

e. By "ar-alkacyl peroxide" I mean a peroxide in which one acyl group attached to the bivalent —O—O— group is an alkacyl group and the other is an aracyl group.

f. By "aprimary carbon atom" I mean a carbon atom of the class consisting of secondary and tertiary carbon atoms.

g. By "primary or secondary or tertiary hydrogen atoms" I mean hydrogen atoms directly attached to primary or secondary or tertiary carbon atoms respectively; and h. By "aprimary hydrogen atom" I mean a hydrogen atom of the class consisting of secondary and tertiary hydrogen atoms.

The preferred diacyl peroxide, as already noted, is diacetyl peroxide; which is effective in all cases and gives the highest yields. I can use dipropionyl peroxide and dibutyryl peroxide fairly effectively, the former more effectively than the latter; and I can use diisobutyryl peroxide, but much less effectively and with rather poor results in some cases.

2

The diacyl peroxide does not itself combine with the smaller ketones. Instead, it acts exclusively to remove aprimary hydrogen atoms from them; whereupon the radicals remaining after that removal of aprimary hydrogen atoms from the smaller ketones unite one with another by single carbon-to-carbon bonds, to produce larger ketones (multi-ketones) which save for the absence of the removed aprimary hydrogen atoms are polymers constituting the sums of two or more original smaller organic molecules.

The smaller ketones to which my invention is applicable are lower ketones in which the groups attached to a keto group are members of the class consisting of lower alkyl groups and lower aralkyl groups, and in which in at least one of those attached groups the carbon atom directly attached to a keto group is an aprimary carbon atom carrying a hydrogen atom, which is thus an aprimary hydrogen atom.

In the reaction produced according to my process, in which a smaller ketone is treated with diacyl peroxide having at least one of its acyl groups an alkacyl group, the diacyl peroxide (most desirably diacetyl peroxide) does not combine with the smaller ketone; as has already been stated. But neither does it act as a mere catalyst, for the reaction that involves the smaller ketone depends completely for its extent upon the amount of diacyl peroxide used. Further, the action of the diacyl peroxide used is entirely different from the action of either hydrogen peroxide or dibenzoyl peroxide.

What happens in the reaction of the diacyl peroxide (using diacetyl peroxide as an example) and a smaller ketone is represented by the following series of formulas:

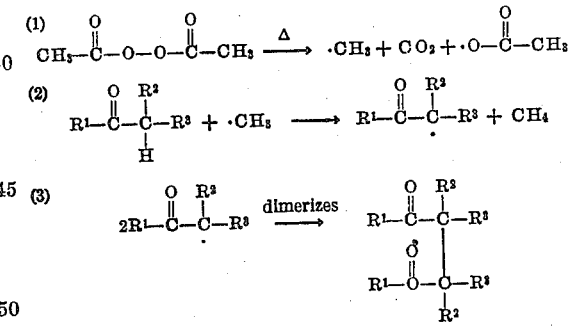

in which $R^1$, $R^2$, and $R^3$ are of the character necessary to make the initial smaller ketone one in which the groups attached to the keto groups are members of the class consisting of lower alkyl groups and lower aralkyl groups, and to make the carbon atom shown directly attached to the keto group an aprimary carbon atom.

Equation 1 represents a decomposition of the diacetyl peroxide into carbon dioxide, a free methyl radical, and a free acetoxy radical. Equation 2 represents the abstraction by the free methyl radical of an aprimary hydrogen atom from the initial smaller ketones, to produce methane and the free radical of the initial smaller ketone. Equation 3 represents the combining (dimerizing) of two of the free radicals of the initial smaller ketone, to form a new carbon-to-carbon bond, thus producing a larger ketone having double the number of carbon atoms and double the number of keto groups of the initial smaller ketone.

By limiting the amount of diacetyl peroxide added, the larger ketone of double the number of carbon atoms and double the number of keto groups may be obtained in high yields, often of the order of 90 to 100 percent of the amount calculated on the basis of the acetyl peroxide used.

The larger ketone with double the number of carbon atoms and double the number of keto groups may in turn be treated with a suitable diacyl peroxide (desirably diacetyl peroxide) to produce a second doubling, provided that after the first doubling there still remains a hydrogen-carrying aprimary carbon atom directly attached to a keto group. Further, again with the same proviso, by using a larger quantity of the diacyl peroxide in the initial reaction with the original ketone, it is possible to get mixtures in which in addition to ketones of double the number of carbon atoms and double the number of keto groups there are compounds of higher multiples of the original number of carbon atoms and keto groups, such as treble the number, quadruple the number, quintuple the number, etc. With some initial ketones, it is possible to substantially limit the multiplying of the number of carbon atoms and keto groups to three-fold (the trimer); but generally the multiplying of the number of carbon atoms and keto groups is to double the number (the dimer) or to quadruple the number of carbon atoms (the tetramer, or the dimer of the dimer).

In some cases, when the ketone treated with the diacyl peroxide contains more than one a-primary hydrogen atom, a mixture of two dimeric substances will result.

In carrying out the general reaction with the diacyl peroxide (desirably diacetyl peroxide) it is usually desirable first to dissolve the diacyl peroxide, in the cold (desirably about 10° C.), in a small portion of the initial ketone to be treated, if that initial ketone is liquid; and then to add that solution very slowly, desirably drop by drop, to a heated larger quantity of the initial ketone. If only the dimer is desired, there is generally a several-fold molecular excess of the initial material to be treated over the diacyl peroxide.

Alternatively, the diacyl peroxide may be dissolved in a suitable solvent, such as carbon tetrachloride, and that cold solution added slowly to a heated and concentrated solution in the same solvent of the initial ketone to be treated. But the reaction in a third substance as a solvent is usually less desirable than when the only compounds present are the diacyl peroxide and the ketone to be treated.

The following are typical examples of the process of this invention, resulting in some products which are themselves new.

*Example 1.—Preparation of 2,3-diacetylbutane*

Diacetyl peroxide is prepared from reagent grade acetic anhydride and sodium peroxide. One mole of the solid diacetyl peroxide so prepared is quickly dried in vacuo. This diacetyl peroxide, preferably dissolved in the cold in a little methyl ethyl ketone or carbon tetrachloride, is introduced slowly and in the substantial absence of water into 3 to 5 mole equivalents (based on the diacetyl peroxide used) of methyl ethyl ketone maintained at 85–95° C. Usually two or more hours should be used for the addition of the peroxide. When the reaction mixture no longer gives a test for peroxide, the excess of methyl ethyl ketone is removed by distillation. The remaining oil is then distilled at reduced pressure. The first distillate is 2,3-diacetylbutane, formed as follows:

(4) 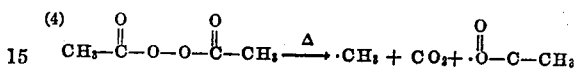

(5) 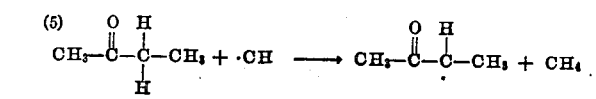

(6) 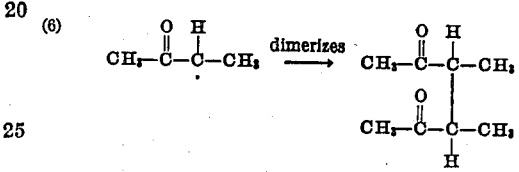

(About 80 percent yield)

A smaller amount of a still higher boiling oil is also formed. This product is probably formed by a removal of a hydrogen atom from the initially produced 1,2-diacetylbutane by the free methyl radical, and the dimerization of the new free radical thus formed to give the "tetramer," the new compound 3,4-dimethyl-2,3,4,5-tetraacetylhexane. The reaction is as follows:

(7) 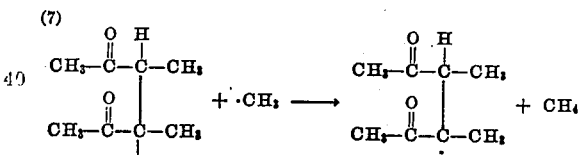

(8) 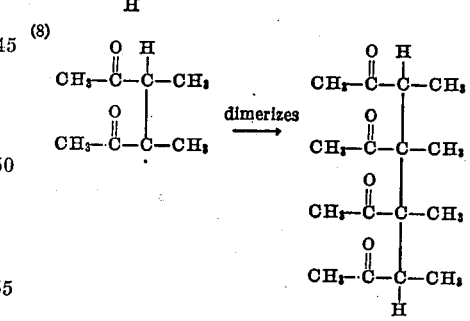

*Example 2*

If diisopropyl ketone is used instead of the methyl ethyl ketone of Example 1, a reaction similar to that described above takes place as follows:

(9) 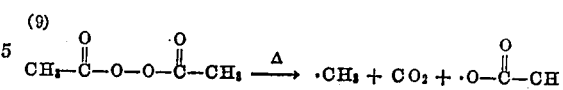

(10) 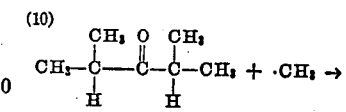

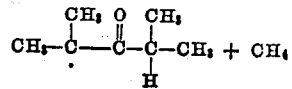

(11) 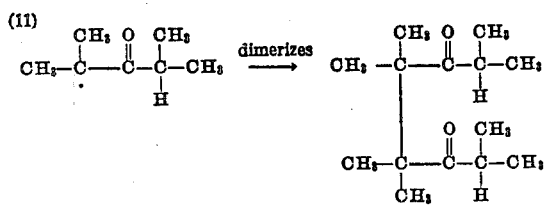

In addition to this dimer, some of the "tetramer" of diisopropyl ketone is formed, in a manner similar to that outlined in Example 1 for forming the "tetramer" of methyl ethyl ketone. The tetramer of diisopropyl ketone has the formula:

(12) 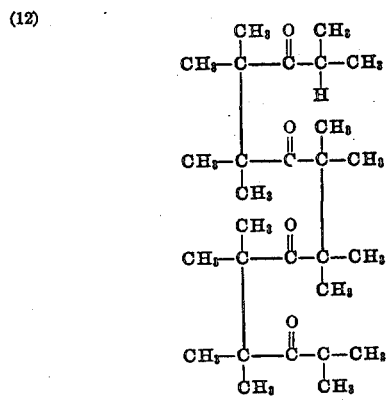

*Example 3*

If methylbenzyl ketone

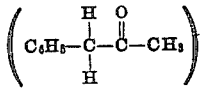

is used instead of the methyl ethyl ketone of Example 1, then by a series of reactions analogous to those already described the "dimer" and the "tetramer" of benzylmethyl ketone are formed. These have the following formulas, respectively:

(13) 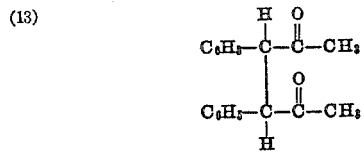

(14) 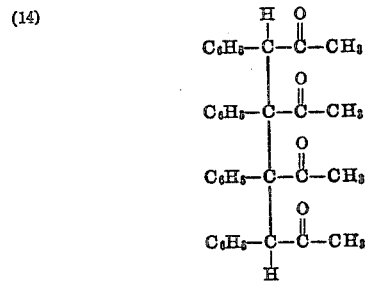

The dimer should occur in both meso and racemic forms, and two forms have been isolated; a high-melting form (M. P. 201° C.) which is little soluble in alcohol, and a low-melting form (M. P. 98° C.) more soluble in alcohol.

*Example 4*

As already indicated, other dialkacyl peroxides than diacetyl peroxide may be used in Examples 1 to 3. However, while dipropionyl, dibutyryl, and diisobutyryl peroxides will give the products obtained in Examples 1 to 3, the best yields are obtained with diacetyl peroxide.

The dialkacyl peroxide which in all cases gives the best yields of dimers, trimers, and tetramers is diacetyl peroxide; because the free methyl radical which comes from it is the most active of the free alkyl radicals. The activity of other free alkyl radicals, produced in the decomposition of higher dialkacyl peroxides, and therefore the yields of desired dimers, trimers, and tetramers, decreases as one proceeds to the free ethyl radical (from dipropionyl peroxide), the free propyl radical (from di-n-butyryl peroxide), the free isopropyl radical (from diisobutyryl peroxide), and the free tertiary-butyl radical (from ditrimethylacetyl peroxide). Thus the free tertiary-butyl radical is the least reactive of all of these, and the yields of the desired products when it is used are negligible. In general, the free methyl radical is most reactive; free primary-alkyl radicals are more reactive than free secondary-alkyl radicals; free secondary-alkyl radicals are more reactive than free tertiary-alkyl radicals; and free alkyl radicals with fewer carbon atoms are more reactive than those with more carbon atoms.

*Example 5*

Instead of diacetyl peroxide or other dialkacyl peroxide, an ar-alkacyl peroxide (or aromatic-aliphatic peroxide) may be used; such for instance as acetyl-benzoyl peroxide. The initial reaction in this case, to produce the free methyl radical, is as follows:

(15) 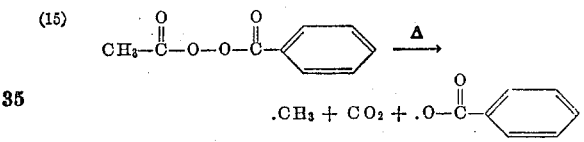

In this Example 5, as in Examples 1, 2, and 3, the free methyl radical is set free, and is the thing which removes an aprimary hydrogen atom from the initial smaller ketone to give methane and the new free radical of that initial smaller ketone; which in turn dimerizes to produce the desired compound with double the number of carbon atoms and double the number of keto groups. Essentially, therefore, there is no difference whether diacetyl peroxide or acetyl-benzoyl peroxide is used; since in both cases free methyl radicals are produced, and those free methyl radicals react with the initial smaller ketone.

On the same basis, other ar-alkacyl peroxides (aliphatic-aromatic peroxides) may be used; such for instance as propionyl-benzoyl peroxide, butyryl-benzoyl peroxide, acetylnaphthoyl peroxide, acetyl-p-methylbenzoyl peroxide, or other peroxide of the general formula

(16)   $R^x$—O—O—$R^y$ in which $R^x$ represents an alkacyl group and $R^y$ represents an aracyl group. These may be used in all of Examples 1 to 3, with the limitations given in those examples for the alkacyl group. Furthermore, the highest yields are obtained when $R^x$ is the acetyl group.

*Example 6*

Similarly, unsymmetrical dialkacyl peroxides may be used in all the examples in place of the symmetrical peroxides named. Examples of these are Acetyl-propionyl peroxide,
Acetyl-butyryl peroxide,
Propionyl-lauryl peroxide.

However, no advantage accrues from these; and they are more difficult to make, and on the whole the yields obtained are poorer than when symmetrical peroxides are used.

I claim as my invention:

1. The process of producing larger ketones which have a plurality of keto groups from smaller ketones which have fewer keto groups and in which the groups attached to a keto group are members of the class consisting of lower alkyl groups and lower aralkyl groups and in which in at least one of those attached groups the carbon atom directly attached to a keto group is an aprimary carbon atom carrying a hydrogen atom; which consists in treating the said smaller ketones at elevated temperature and in the substantial absence of water with a diacyl peroxide in which at least one of the acyl groups is an alkacyl group of not more than four carbon atoms.

2. The process of producing larger ketones from smaller ketones as set forth in claim 1, in which the diacyl peroxide is a dialkacyl peroxide.

3. The process of producing larger ketones from smaller ketones as set forth in claim 1, in which an acyl group of the diacyl peroxide is the acetyl group.

4. The process of producing larger ketones from smaller ketones as set forth in claim 1, in which the diacyl peroxide is diacetyl peroxide.

5. The process of producing larger ketones from smaller ketones as set forth in claim 1, in which the diacyl peroxide is an aralkacyl peroxide.

6. The process of producing larger ketones from smaller ketones as set forth in claim 1, in which the smaller ketone is an unsubstituted dialkyl ketone.

7. The process of producing larger ketones from smaller ketones as set forth in claim 1, in which the smaller ketone is methyl-ethyl ketone.

8. The process of producing larger ketones from smaller ketones as set forth in claim 1, in which the smaller ketone is di-isopropyl ketone.

9. The process of producing larger ketones from smaller ketones as set forth in claim 1, in which the smaller ketone is an alkyl-aralkyl ketone.

10. The process of producing larger ketones from smaller ketones as set forth in claim 1, in which the smaller ketone is methyl-benzyl ketone.

MORRIS S. KHARASCH.

REFERENCES CITED

The following references are of record in the file of this patent:

UNITED STATES PATENTS

| Number | Name | Date |
|---|---|---|
| 2,426,224 | Kharasch | Aug. 26, 1947 |

OTHER REFERENCES

Freer et al., American Chemical Journal, vol. 27, pp. 186–188.

Freer et al., Beilstein (4th ed., 1920), vol. 2, page 170.

Lippman, Beilstein (4th ed., 1922), vol. 5, pp. 643, 650.

Gelissen et al., Chemical Abstracts, vol. 19, p. 1564 (1925).

Gelissen et al., Chemical Abstracts, vol. 19, p. 1858 (1925).

Walker, Journal Chemical Society (London), 1928, pp. 2040–2043.

Gambarjan, Beilstein (4th ed. 1929), vol. 9, page 180.

Gambarjan, Beilstein (4th ed. 1929), vol. 12, page 177.

Walker, Beilstein (2nd Suppl. 4th ed., 1942), vol. 2, page 174.

Kharasch et al., Journal American Chemical Society, pp. 15–17 (1943).

Certificate of Correction

Patent No. 2,477,621

August 2, 1949

MORRIS S. KHARASCH

It is hereby certified that errors appear in the printed specification of the above numbered patent requiring correction as follows:

Column 2, line 50, formula 3, for "$R^1$—O—C—$R^3$" read $R^1$—$C$—$C$—$R^3$; column 3, line 4, for the word "ketones" read *ketone*; column 4, lines 14 and 15, formula 4, right-hand portion thereof, for

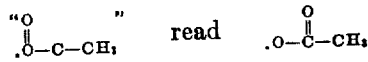

line 18, formula 5, middle portion thereof, for "+.CH" read $+.CH_3$; line 66, formula 9, right-hand portion thereof, for ".O—C—CH" read $.O$—$C$—$CH_3$;

and that the said Letters Patent should be read with these corrections therein that the same may conform to the record of the case in the Patent Office.

Signed and sealed this 17th day of January, A. D. 1950.

[SEAL]

THOMAS F. MURPHY,
*Assistant Commissioner of Patents.*